US009244529B2

(12) United States Patent
Model

(10) Patent No.: US 9,244,529 B2
(45) Date of Patent: Jan. 26, 2016

(54) POINT-OF-GAZE ESTIMATION ROBUST TO HEAD ROTATIONS AND/OR DEVICE ROTATIONS

(71) Applicant: Dmitri Model, Toronto (CA)

(72) Inventor: Dmitri Model, Toronto (CA)

( * ) Notice: Subject to any disclaimer, the term of this patent is extended or adjusted under 35 U.S.C. 154(b) by 76 days.

(21) Appl. No.: 14/165,131

(22) Filed: Jan. 27, 2014

(65) Prior Publication Data

US 2014/0211995 A1   Jul. 31, 2014

Related U.S. Application Data

(60) Provisional application No. 61/830,264, filed on Jun. 3, 2013, provisional application No. 61/757,186, filed on Jan. 27, 2013.

(51) Int. Cl.
  *G06K 9/00*   (2006.01)
  *G06F 3/01*   (2006.01)
  *A61B 3/14*   (2006.01)
(52) U.S. Cl.
  CPC ..................... *G06F 3/013* (2013.01)
(58) Field of Classification Search
  CPC .............. G06K 9/00; G06F 3/01; G06F 3/013
  USPC .......................... 382/103.107, 236, 103, 107;
                             348/169–172; 351/208, 209
  See application file for complete search history.

(56) References Cited

U.S. PATENT DOCUMENTS 6,578,962 B1 *   6/2003   Amir ................... G06K 9/0061
                                                345/157
7,533,989 B2 *   5/2009   Ebisawa ............. G06K 9/00604
                                                351/208

OTHER PUBLICATIONS

S.W. Shih, Y.-T. Wu, and J. Liu, "A calibration-free gaze tracking technique," in Proceedings of 15th Int. Conference on Pattern Recognition 2000, pp. 201-204.
S. W. Shih and J. Liu, "A novel approach to 3-d gaze tracking using stereo cameras," IEEE Transactions on Systems, Man, and Cybernetics, Part B: Cybernetics, vol. 34, pp. 234-245, Feb. 2004.
E. D. Guestrin and M. Eizenman, "General theory of remote gaze estimation using the pupil center and corneal reflections," IEEE Transactions on Biomedical Engineering, vol. 53, pp. 1124-1133, Jun. 2006.
E. D. Guestrin and M. Eizenman, "Remote point-of-gaze estimation requiring a single-point calibration for applications with infants," presented at the Proc. of the 2008 Symposium on Eye Tracking Research & Applications, Savannah, GA, USA, 2008.
(Continued)

*Primary Examiner* — Abolfazl Tabatabai
(74) *Attorney, Agent, or Firm* — Christopher Pilling

(57) ABSTRACT

Point-of-gaze of a user looking at a display is estimated, taking into account rotation of the user's head or rotation of the display. An image of an eye of the user is captured. The image is processed to determine coordinates in the image of defined eye features, sufficient to determine the eye's optical axis. At least one angle is determined, the at least one angle proportional to an angle between (i) a line coincident with an edge of the display and (ii) an intersection of the sagittal plane of the user's head with a plane of the display. An intersection of the eye's line-of-sight with the plane of the display is estimated using the eye's optical axis, and using the at least one angle to account for rotation of the user's head or the display.

22 Claims, 15 Drawing Sheets

(56) References Cited

OTHER PUBLICATIONS

J. G. Wang and E. Sung, "Study on eye gaze estimation," IEEE Transactions on Systems, Man, and Cybernetics, Part B: Cybernetics, vol. 32, pp. 332-350, 2002.

J.-G. Wang and E. Sung, "Gaze determination via images of irises," Image and Vision Computing, vol. 19, pp. 891-911, 2001.

E. Trucco, T. Anderson, M. Razeto, and S. Ivekovic, "Robust correspondenceless 3-d iris location for immersive environments," in Image analysis and processing—ICIAP 2005. vol. 3617, F. Roli and S. Vitulano, Eds.: Springer Berlin / Heidelberg, 2005, pp. 123-130.

E. D. Guestrin, "Remote, non-contact gaze estimation with minimal subject cooperation," PhD Thesis, Department of Electrical and Computer Engineering, University of Toronto, Toronto, ON, Canada, 2010.

D. Model, "A Calibration Free Estimation of the Point of Gaze and Objective Measurement of Ocular Alignment in Adults and Infants", PhD Thesis, Department of Electrical and Computer Engineering, University of Toronto, Toronto, ON, Canada, 2011.

A. Villanueva, J. J. Cerrolaza, and R. Cabeza (2008), Geometry Issues of Gaze Estimation, Advances in Human Computer Interaction, S. Pinder (Ed.), ISBN:978-953-7619-15-2, Intech.

E. Murphy-Chutorian; M.M.Trivedi, "Head Pose Estimation in Computer Vision: A Survey," Pattern Analysis and Machine Intelligence, IEEE Transactions on, vol. 31, No. 4, pp. 607-626, Apr. 2009.

Z. Zhang, "Flexible Camera Calibration by Viewing a Plane from Unknown Orientations", ICCV, 1999; T.A. Clarke and J.G. Fryer, "The Development of Camera Calibration Methods and Models", Photogrammetric Record, 16(91): 51-66, Apr. 1998.

D.C. Brown, "Close-Range Camera Calibration", Photogrammetric Engineering, pp. 855-866, vol. 37, No. 8, 1971.

\* cited by examiner

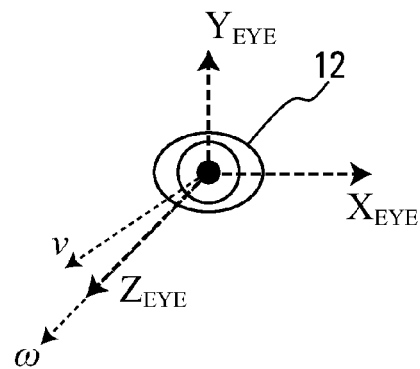
FIG. 3
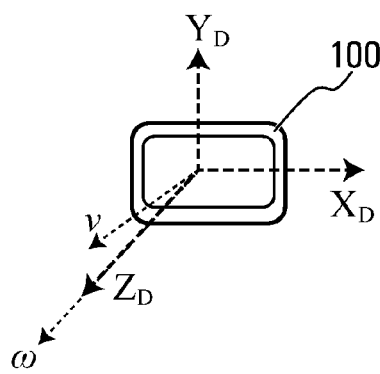 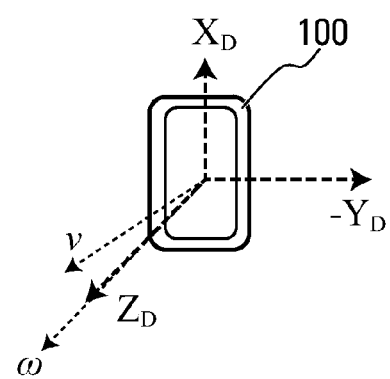
FIG. 4A                FIG. 4B

POINT-OF-GAZE ESTIMATION ROBUST TO HEAD ROTATIONS AND/OR DEVICE ROTATIONS

CROSS-REFERENCE TO RELATED APPLICATIONS

This application claims priority from U.S. Provisional Patent Application No. 61/757,186 filed Jan. 27, 2013, the contents of which are hereby incorporated herein by reference, and from U.S. Provisional Patent Application No. 61/830,264 filed Jun. 3, 2013, the contents of which are also hereby incorporated herein by reference.

TECHNICAL FIELD

This relates to point-of-gaze estimation, and more particularly, to point-of-gaze estimation that accounts for head rotations and/or device rotations.

BACKGROUND

Estimation of a person's point-of-gaze (also referred to as point-of-regard) has become an important tool in a variety of applications, including, for example, the study of visual and oculomotor systems, the study of reading behavior, marketing/advertising research, and the control of device user interfaces (e.g., graphical user interfaces) using eye movements.

Methods of estimating a person's point-of-gaze using estimates of an eye's optical axis determined from images of the eye are known. Examples of such methods include: S.-W. Shih, Y.-T. Wu, and J. Liu, "A calibration-free gaze tracking technique," in Proceedings of 15th Int. Conference on Pattern Recognition 2000, pp. 201-204 (hereinafter, "Shih 2000"); S. W. Shih and J. Liu, "A novel approach to 3-d gaze tracking using stereo cameras," IEEE Transactions on Systems, Man, and Cybernetics, Part B: Cybernetics, vol. 34, pp. 234-245, February 2004 (hereinafter, "Shih 2004"); E. D. Guestrin and M. Eizenman, "General theory of remote gaze estimation using the pupil center and corneal reflections," IEEE Transactions on Biomedical Engineering, vol. 53, pp. 1124-1133, June 2006 (hereinafter, "Guestrin 2006"); E. D. Guestrin and M. Eizenman, "Remote point-of-gaze estimation requiring a single-point calibration for applications with infants," presented at the Proc. of the 2008 Symposium on Eye Tracking Research & Applications, Savannah, Ga., USA, 2008 (hereinafter, "Guestrin 2008"); J. G. Wang and E. Sung, "Study on eye gaze estimation," IEEE Transactions on Systems, Man, and Cybernetics, Part B: Cybernetics, vol. 32, pp. 332-350, 2002 (hereinafter, "Wang 2002"); J.-G. Wang and E. Sung, "Gaze determination via images of irises," Image and Vision Computing, vol. 19, pp. 891-911, 2001 (hereinafter, "Wang 2001"); E. Trucco, T. Anderson, M. Razeto, and S. Ivekovic, "Robust correspondenceless 3-d iris location for immersive environments," in Image analysis and processing—ICIAP 2005. vol. 3617, F. Roli and S. Vitulano, Eds.: Springer Berlin/Heidelberg, 2005, pp. 123-130 (hereinafter, "Trucco 2005"); Amir et al., U.S. Pat. No. 6,578,962, "Calibration-free eye gaze tracking" (hereinafter "Amir"), E. D. Guestrin, "Remote, non-contact gaze estimation with minimal subject cooperation," PhD Thesis, Department of Electrical and Computer Engineering, University of Toronto, Toronto, ON, Canada, 2010; and D. Model, "A Calibration Free Estimation of the Point of Gaze and Objective Measurement of Ocular Alignment in Adults and Infants", PhD Thesis, Department of Electrical and Computer Engineering, University of Toronto, Toronto, ON, Canada, 2011, the contents of which are hereby incorporated herein by reference.

As is understood, although the optical axis is an axis of symmetry of the eye-ball, a person's line-of-sight is not directed along the optical axis. Specifically, the human retina does not have a uniform density of photoreceptors. Instead, there exists an area on the retina with a pronounced peak in the density of photoreceptors. This area is known as the fovea and subtends approximately a solid angle of one degree of the visual field. In order to see an object in detail, the eye is oriented such that the image of the object is projected onto the fovea. Thus, line-of-sight may be modeled, for example, as a line that extends from the fovea and through, e.g., the center of curvature of the cornea. This line-of-sight deviates from the optical axis by an angular offset (see, e.g., Guestrin 2006 and Guestrin 2008 noted above, and R. H. S. Carpenter, Movements of the eyes, London, UK: Pion, 1977). This line-of-sight will also be referred to herein as the visual axis; it may also be referred to as the foveal axis, the eye-gaze vector, or the gaze vector.

While the optical axis can be readily estimated from an image of the eye (e.g., based in part on the location of the pupil center in such an image), the visual axis cannot be directly estimated from an image of the eye (e.g., because the fovea is not observable in such images). As such, prior art methods have relied simply on the optical axis of the eye as a proxy for the line-of-sight (see, e.g., Amir), or have estimated the visual axis indirectly by applying estimates of the angular offset between the optical and visual axes to estimates of the optical axis (see, e.g., Guestrin 2008). As will be appreciated, methods that take into account the angular offset between optical and visual axes generally provide more accurate estimates of point-of-gaze than methods that do not take into account this angular offset.

Unfortunately, existing methods of estimating point-of-gaze that take into account the angular offset between optical and visual axes are intolerant to substantial rotations of a person's head relative to an estimation device, or substantial rotations of the estimation device relative to the head, and thus fail to provide accurate estimates of point-of-gaze when such head/device rotations occur. This has, for example, inhibited the implementation of point-of-gaze estimation on mobile devices for which substantial rotations are commonplace.

Accordingly, there is a need for improved point-of-gaze estimation methods and devices.

SUMMARY

According to an aspect, there is provided a method of estimating point-of-gaze of a user looking at a display, the method including: capturing an image of an eye of the user; processing the image to determine coordinates in the image of a plurality of defined eye features sufficient to determine the optical axis of the eye of the user; determining at least one angle proportional to an angle between (i) a line coincident with an edge of the display and (ii) an intersection of the sagittal plane of the head of the user with a plane of the display; and estimating an intersection of the line-of-sight of the eye of the user with the plane of the display, using the optical axis of the eye, and using the at least one angle to account for rotation of the head of the user or the display.

According to another aspect, there is provided a method of estimating point-of-gaze of a user looking at a display, the method including: capturing an image of an eye of the user; processing the image to determine coordinates in the image of a plurality of defined eye features sufficient to determine the optical axis of the eye of the user; determining at least one angle proportional to an angle between (i) a line coincident with an edge of the display and (ii) an intersection of the sagittal plane of the head of the user with a plane of the display; and estimating an intersection of the line-of-sight of the eye of the user with the plane of the display, using the coordinates of the plurality of defined eye features sufficient to determine the optical axis of the eye, and using the at least one angle to account for rotation of the head of the user or the display.

According to a further aspect, there is provided a device for estimating point-of-gaze of a user looking at a display. The device includes a camera; at least one processor interconnected to the camera; and memory interconnected to the at least one processor. The memory stores software code that, upon execution by the at least one processor, causes the device to: receive an image of an eye of the user from the camera; process the image to determine coordinates in the image of a plurality of defined eye features sufficient to determine the optical axis of the eye of the user; determine at least one angle proportional to an angle between (i) a line coincident with an edge of the display and (ii) an intersection of the sagittal plane of the head of the user with a plane of the display; and estimate an intersection of the line-of-sight of the eye of the user with the plane of the display, using the optical axis of the eye, and using the at least one angle to account for rotation of the head of the user or the display.

Other features will become apparent from the drawings in conjunction with the following description.

BRIEF DESCRIPTION OF THE DRAWINGS

In the figures which illustrate example embodiments,

FIG. 3 is a schematic diagram of an example frame of reference attached to the estimation device of FIG. 1;

FIG. 4A is a schematic diagram of an example frame of reference attached to an eye;

FIG. 4B is a schematic diagram of an alternate frame of reference attached to an eye, rotated 90 degrees relative to the frame of reference of FIG. 4A;

DETAILED DESCRIPTION

Figure 1:
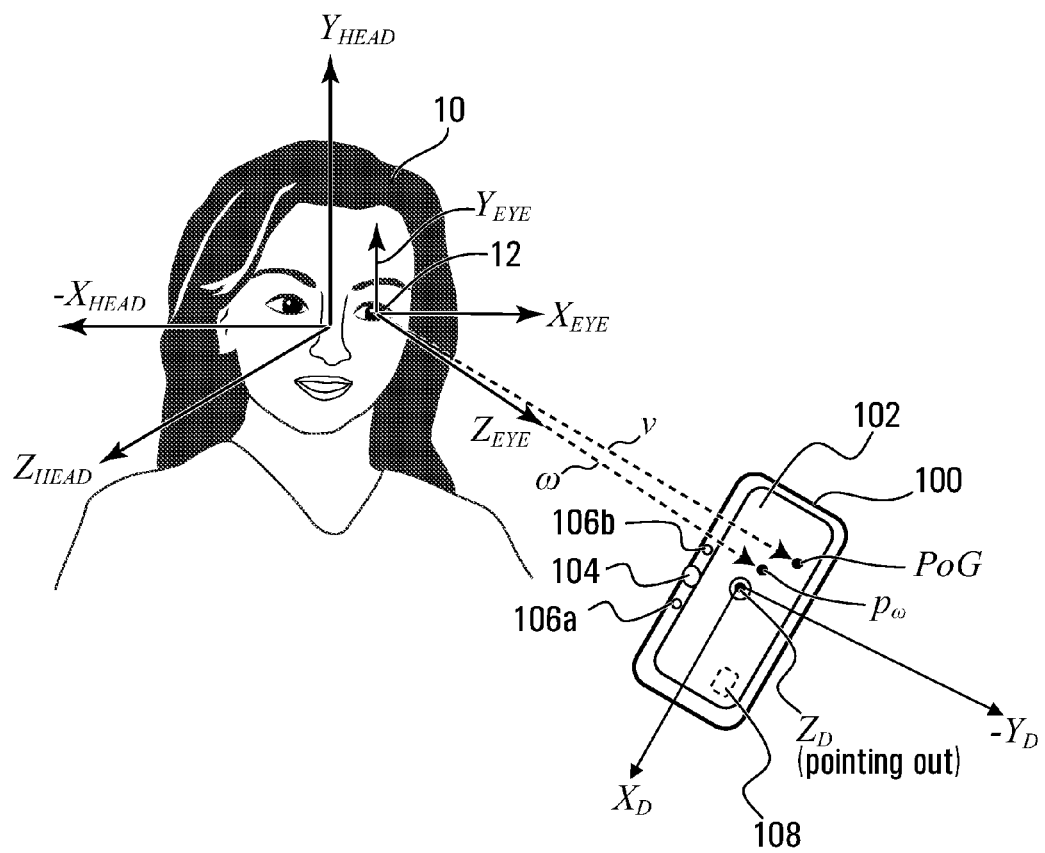
FIG. 1 is a schematic diagram of an estimation device estimating the point-of-gaze of a user looking towards the device, exemplary of an embodiment.

FIG. 1 illustrates a point-of-gaze estimation device 100, exemplary of an embodiment. As will become apparent, device 100 is a computing device that estimates a user's point-of-gaze using images of an eye of that user (e.g., eye 12). As will also become apparent, device 100 estimates point-of-gaze in manners that account for an angular offset between the optical and visual axes of the user's eye, while also accounting for rotations of the user's head (e.g., head 10) relative to device 100 and/or rotations of device 100 relative to the user's head. As depicted, device 100 is a mobile computing device, namely, a tablet computing device. However, as detailed below, device 100 may be another type of mobile computing device, a desktop or laptop computing device, or the like.

As depicted in FIG. 1, device 100 estimates a user's point-of-gaze using the user's line-of-sight extending from eye 12, while the user is looking at display 102 of device 100. As such, the point-of-gaze (point PoG in FIG. 1) is estimated as the point of intersection between the visual axis of eye 12 (line v) and display 102. As depicted, an angular offset exists between the optical axis of eye 12 (line ω) and the visual axis of eye 12 (line v). Thus, the point of intersection between the optical axis and display 102 (point $p_\omega$ in FIG. 1) is offset on display 102 from the point-of-gaze (point PoG).

Figure 2:
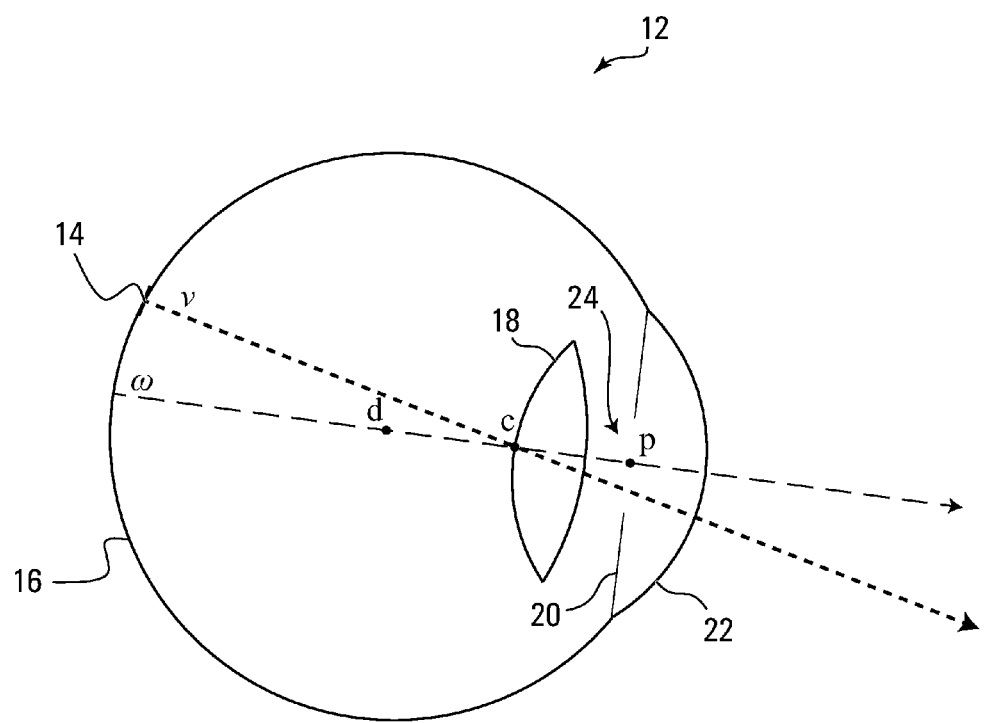
FIG. 2 is a schematic diagram of an eye.

FIG. 2 schematically illustrates eye 12 according to a conventional model of the human eye. As depicted, eye 12 includes retina 16, lens 18, iris 20, cornea 22, and pupil 24. Retina 16 includes fovea 14. Pupil 24 has a pupil center (point p). Eye 12 has a center of rotation (point d) and a center of corneal curvature (point c). The optical axis of eye 12 (line ω) extends from retina 16 through the center of rotation, the center of corneal curvature, and the pupil center. Meanwhile, the visual axis (line v) of eye 12 extends from fovea 14 through the center of corneal curvature. As depicted, the visual axis (line v) deviates from the optical axis (line ω) by an angular offset.

This offset between the optical and visual axes is eye/subject dependent, but is substantially invariant for a given eye if measured relative to a frame of reference that is attached to the eye and translates/rotates with the eye (i.e., an eye frame of reference). However, the offset between the optical and visual axes may not remain constant if measured in a frame of reference that is not attached to the eye, e.g., a frame of reference attached to a point-of-gaze estimation device such as device 100 (i.e., a device frame of reference). Specifically, the breakdown of the offset to its components (e.g., "horizontal" and "vertical" components) in the device frame of reference will change if the eye frame of reference rotates relative to the device frame of reference (or if the device frame of reference rotates relative to the eye frame of reference).

The effect of such rotations on the breakdown of the offset between the optical and visual axes of the eye is further described with reference to FIG. 3 and FIGS. 4A/4B. In particular, FIG. 3 depicts an example frame of reference attached to an eye, namely, an example eye coordinate system $X_{EYE}\text{-}Y_{EYE}\text{-}Z_{EYE}$. As depicted, the optical axis ω coincides with the $Z_{EYE}$-axis and the visual axis v lies entirely in the $X_{EYE}\text{-}Z_{EYE}$ plane of this eye coordinate system. Within this eye coordinate system, the offset between the optical and visual axes is entirely "horizontal", i.e., the offset lies in the $X_{EYE}\text{-}Z_{EYE}$ plane.

FIG. 4A depicts an example frame of reference attached to an estimation device such as device 100, namely, an example device coordinate system $X_D\text{-}Y_D\text{-}Z_D$. This device coordinate system is not rotated relative to the eye coordinate system of FIG. 3. As such, the $Z_D$-axis is parallel to the $Z_{EYE}$-axis of FIG. 3 (and thus parallel to the optical axis ω of the eye), and the visual axis v lies in the "horizontal" ($X_D\text{-}Z_D$) plane of the device coordinate system. Therefore, the offset between the optical and visual axes will be "horizontal" in the device coordinate system, i.e., the offset lies in $X_D\text{-}Z_D$ plane.

FIG. 4B depicts another example frame of reference attached to the estimation device such as device 100, namely, a device coordinate system $X_D\text{-}Y_D\text{-}Z_D$ that is rotated 90 degrees around the $Z_D$-axis relative to the orientation of the frame of reference of FIG. 4A. As depicted in FIG. 4B, the $Z_D$-axis is still parallel to the optical axis w, but the visual axis v now entirely lies in the "vertical" ($Y_D\text{-}Z_D$) plane of the device coordinate system. Therefore, the offset between the optical and visual axes is "vertical" in the device coordinate system, i.e., the offset lies in the $Y_D\text{-}Z_D$ plane.

Thus, as will be appreciated from the above examples, even if the angular offset between optical and visual axes of eye 12 is known in the eye coordinate system, the angular offset is indeterminate in the device coordinate system unless the orientation of the device coordinate system relative to the eye coordinate system is known. Consequently, when device 100/display 102 rotates relative to eye 12/head 10 (or eye 12/head 10 rotates relative to device 100/display 102), knowledge of the relative orientation of the frames of reference of device 100 and eye 12 may be used to account for the noted angular offset, e.g., when estimating point-of-gaze in the device coordinate system $X_D\text{-}Y_D\text{-}Z_D$ of device 100.

As will be appreciated, in the context of the foregoing, a rotation of head 10 relative to the frame of reference of device 100 is equivalent to a rotation of device 100/display 102 relative to eye 12/head 10 in the opposite direction.

Further, while it is not typical for a head (e.g., head 10) to roll more than 45 degrees, in embodiments in which device 100 is a mobile computing device, device 100/display 102 can easily be rotated 90 or 180 degrees relative to eye 12/head 10.

Returning now to FIG. 1, in the depicted embodiment, device 100 is such a mobile computing device (e.g., a tablet computing device, a smart-phone device, or the like). However, in other embodiments, device 100 could equally be a desktop computing device, a laptop computing device, or the like. In the depicted embodiment, device 100 includes display 102, video camera 104, two light sources 106a and 106b, and gyroscope 108.

Display 102 may be a conventional LCD screen, as typically included in conventional mobile computing devices. As depicted, display 102 is integral to device 100. However, in other embodiments, display 102 could be separate from device 100 (e.g., when device 100 is a desktop computing device), and connected thereto by way of a suitable display interface and connection. In some embodiments, display 102 may be a touchscreen display.

Video camera 104 is used to capture images of the user's head 10 including eye 12. As such, video camera 104 has a field of view that encompasses at least a portion of the user's head 10, including eye 12. Video camera 104 may, for example, be a conventional video camera, as commonly included in tablet computing devices and smart-phone devices. In some embodiments, video camera 104 may be an infrared camera adapted to sense near-infrared and infrared light. Video camera 104 captures video images at a resolution that allows image coordinates of defined features of eye 12 and head 10 to be determined, in manners detailed below. For example, in some embodiments, video camera 104 may be a camera that captures images having at least 0.3 megapixels. Video camera 104 may capture video images at a fixed or variable frame rate, allowing point-of-gaze to be estimated at a corresponding frequency. For example, in some embodiments, video camera 104 may capture images at a frame rate between 0.1 and 1000 frames per second.

Light sources 106a and 106b are used to generate reflections in cornea 22 of eye 12 (FIG. 2). Such reflections may be referred to as "corneal reflections" or "glints". Light sources may also function to illuminate head 10 and/or eye 12 to allow device 100 to be operated under low ambient light conditions. To these ends, each of light source 106a and 106b may include one or more LEDs. In embodiments in which a light source 106a/106b includes multiple LEDs, the LEDs are arranged in close proximity such that each light source can be regarded as a single point source during estimation of point-of-gaze using corneal reflections of the light sources, as detailed below. In some embodiments, light sources 106a and 106b may be near-infrared light sources (e.g., emitting light at a wavelength of approximately 850 nm). Conveniently, this allows the light sources to be operated without emitting light visible to users of device 100.

In some embodiments, one or both of light sources 106a and 106b may be omitted. In particular, in embodiments in which point-of-gaze is estimated using only one corneal reflection, device 100 may include only one of light sources 106a and 106b. In embodiments in which point-of-gaze is estimated without using any corneal reflections, both of light sources 106a and 106b may be omitted.

Gyroscope 108 may be optionally included for determining the orientation of device 100. Gyroscope 108 may be a conventional gyroscope, as commonly included in conventional tablet computing devices and smart-phone devices. For example, gyroscope 108 may be a three-axis sensor that senses angular acceleration of device 100 in each of X, Y, Z axes in a fixed frame of reference (e.g., a World Coordinate System or WCS, not shown).

In some embodiments, device 100 may also include an accelerometer that may be used instead of or in conjunction with gyroscope 108 to determine the orientation of device 100. In other embodiments, gyroscope 108 may be replaced with another type of sensor or another combination of sensors suitable for determining the orientation of device 100, as will be apparent to those of ordinary skill in the art. In yet other embodiments, gyroscope 108 and other sensors for determining the orientation of device 100 may be omitted, e.g., when the position of device 100 can be assumed to be fixed relative to the WCS.

Figure 5:
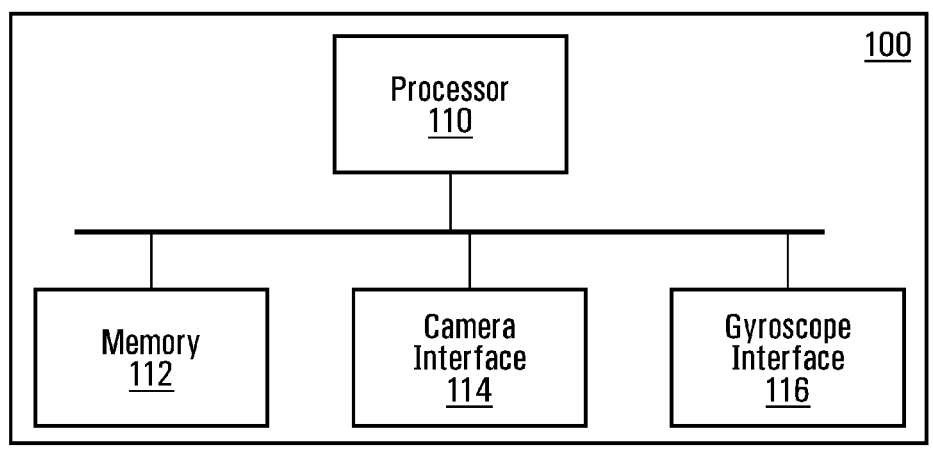
FIG. 5 is a high-level block diagram of a computing device that may function as the estimation device of FIG. 1.

FIG. 5 is a high-level block diagram of a computing device that may function as estimation device 100. As illustrated, estimation device 100 includes one or more processors 110, a suitable combination of persistent storage memory 112, random-access memory and read-only memory, a camera interface 114 for communication with camera 104, and a gyroscope interface 116 for communication with gyroscope 108. Processor 110 may be an ARM, Intel x86, PowerPC processor, or the like.

Figure 6:
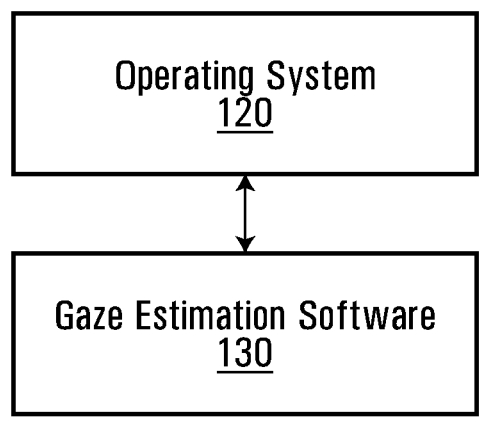
FIG. 6 is a high-level block diagram illustrating the software organization of the estimation device of FIG. 1.

FIG. 6 illustrates a simplified organization of example software components stored within memory 112 (FIG. 5) of device 100. As illustrated, these software components include operating system (OS) software 120 and gaze estimation software 130. Estimation device 100 executes these software components to adapt it to operate in manners of embodiments, as detailed below.

OS software 120 may, for example, be mobile device operating system such as Android, BlackBerry OS, iOS, Windows Phone, or the like. OS software 120 could also be Unix-like operating system (e.g., Linux, FreeBSD, Solaris, OSX, etc.), a Windows operating system, or the like. OS software 120 allows gaze estimation software 130 to access processor 110, memory 112, camera interface 114, and gyroscope interface 116, as well as other communication/peripheral interfaces (not shown) of device 100.

Figure 7:
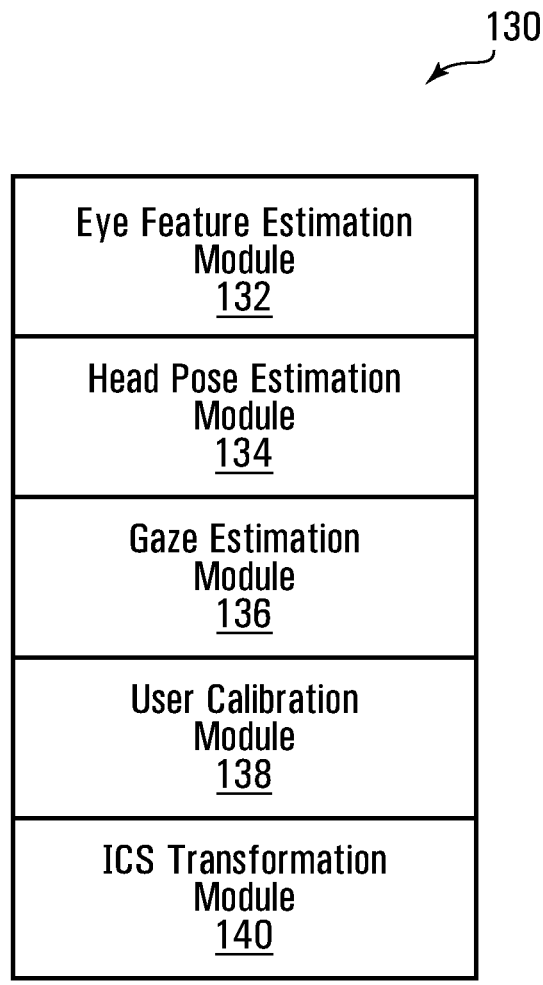
FIG. 7 is a high-level block diagram of the modules of the point-of-gaze estimation software of FIG. 6, executing at the estimation device of FIG. 1.

As illustrated in FIG. 7, gaze estimation software 130 includes eye feature estimation module 132, head pose estimation module 134, gaze estimation module 136, user calibration module 138, and ICS transformation module 140. These modules may be written using conventional computing languages such as C, C++, C#, Objective C, Ruby, Java, Perl, JavaScript, Visual Basic, or the like. These modules may be in the form of executable applications, scripts, or statically or dynamically linkable libraries. The function of each of these modules is detailed below.

Eye feature estimation module 132 processes images captured by video camera 104 and received by gaze estimation software 130 by way of camera interface 114. In particular, eye feature estimation module 132 processes such images to determine image coordinates of a plurality of defined eye features, as imaged. These image coordinates are provided to gaze estimation module 136, which uses them to estimate point-of-gaze, in manners detailed below.

As discussed below, in the depicted embodiment of FIG. 1, gaze estimation module 136 uses the image coordinates of the pupil center of eye 12 and two corneal reflections on the cornea of eye 12, produced by light sources 106*a* and 106*b*, respectively. As such, eye feature estimation module 132 processes each image to determine the image coordinates of the pupil center and the two corneal reflections.

In other embodiments, eye feature estimation module 132 may also process images to determine the image coordinates of other eye features, as may be used by gaze estimation module 136. Such other eye features may be, for example, the iris-sclera boundary, the iris center, the pupil boundary, or the like.

Eye feature estimation module 132 processes images to identify defined eye features using conventional image processing techniques. Examples of such techniques are described in A. Villanueva, J. J. Cerrolaza, and R. Cabeza (2008), Geometry Issues of Gaze Estimation, Advances in Human Computer Interaction, S. Pinder (Ed.), ISBN:978-953-7619-15-2, Intech., the contents of which are hereby incorporated herein by reference, Shih 2004, Wang 2002, Wang 2001, and Trucco 2005. Other examples of conventional image processing techniques are described in Gonzalez, Digital Image Processing, Addison-Wesley, 1993 (hereinafter, "Gonzalez 1993") and E. Trucco and A. Verri, Introductory techniques for 3-d computer vision. Upper Saddle River, N.J.: Prentice Hall, 1998 (hereinafter, "Trucco 1998"), the contents of which are hereby incorporated herein by reference.

Coordinates within the image of the defined eye features, once determined by eye feature estimation module 132, are provided to gaze estimation module 136.

Head pose estimation module 134 provides estimates of "head pose", namely, the rotation of head 10 relative to device 100 (or a rotation of device 100 relative to head 10). These estimates of "head pose" are provided to gaze estimation module 136, which uses them to estimate point-of-gaze, in manners detailed below. In particular, head pose estimation module 134 processes images captured by video camera 104 to determine image coordinates of a plurality of defined head features, and estimates head pose using these image coordinates.

Figure 8:
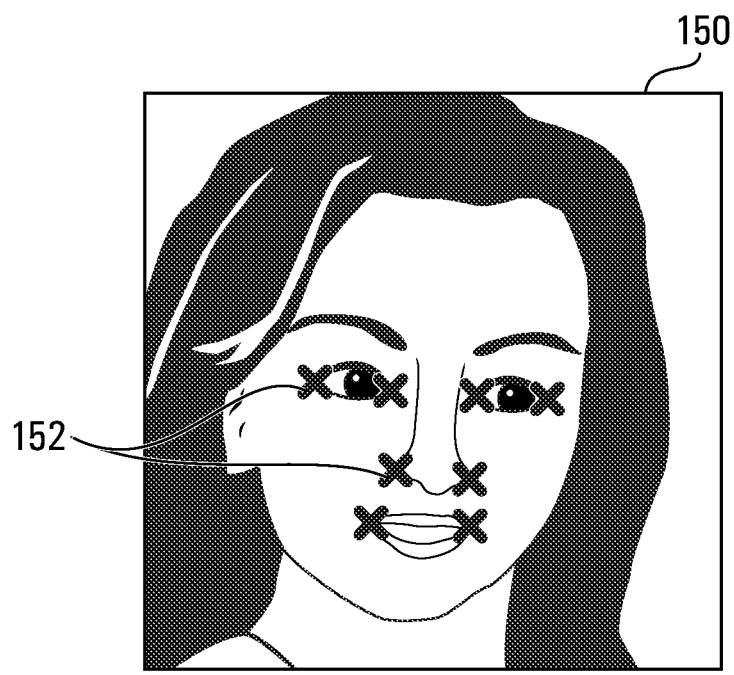
FIG. 8 is a diagram illustrating an example image of a user's head, and a plurality of defined head features.

FIG. 8 depicts an image 150 including a user's head, which includes a number of defined head features. As depicted, head features of interest may include, for example, the corners of the eyes, the corners of the nose, the corners mouth. As depicted, these defined head features have been identified and located as points 152, upon processing of image 150 by head pose estimation module 134.

Figure 9:
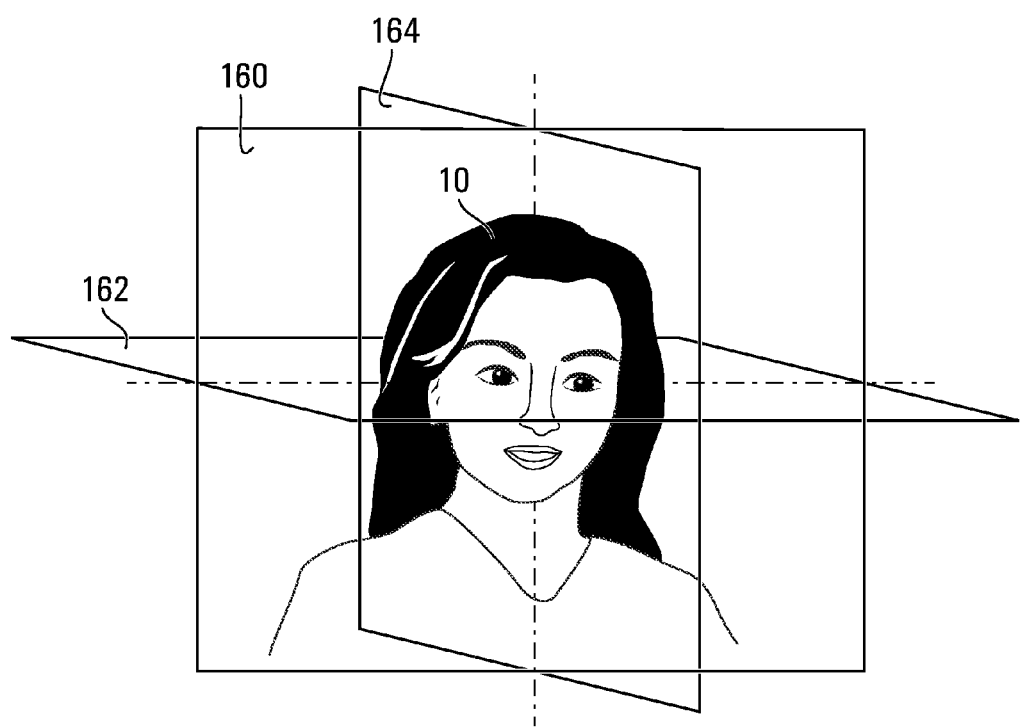
FIG. 9 is a diagram illustrating three anatomical planes of a user's head.

As discussed below, in the depicted embodiment of FIG. 1, gaze estimation module 136 requires a particular component of head pose, namely, an angle of head roll. The angle is further described with reference to FIGS. 9 and 10. In particular, FIG. 9 illustrate the anatomical planes of a head (e.g., head 10), namely, coronal plane 160, axial plane 162, and sagittal plane 164. As will be appreciated, such planes are defined relative to the head, and move with the head.

Figure 10:
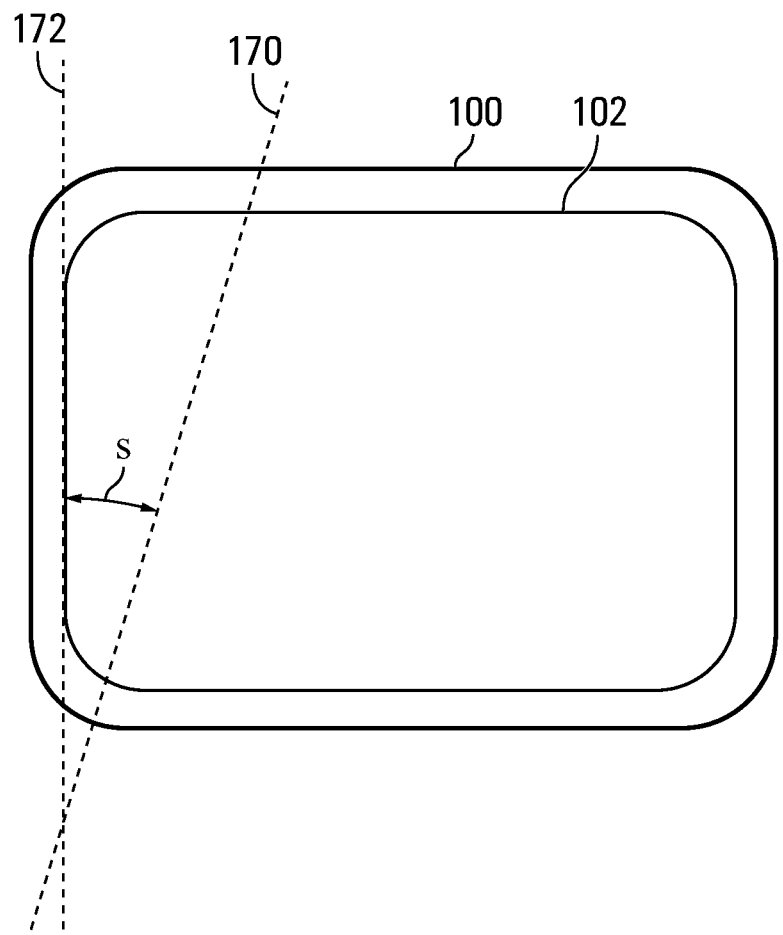
FIG. 10 is a schematic diagram showing a head roll angle.

The head roll angle may be defined with reference to sagittal plane 164, as illustrated in FIG. 10. As will be appreciated, for a user generally facing device 100, the angle of the head roll will be proportional to the angle s between lines 170 and 172, where line 170 is the line of intersection of the sagittal plane 164 with the plane of display 102 of device 100 and line 172 is a line coincident with an edge of display 102 (e.g., the left vertical edge, as shown).

Head pose estimation module 134 processes images to identify head features using conventional image processing techniques. Examples of such techniques are described in Gonzalez 1993 and E. Murphy-Chutorian; M. M. Trivedi, "Head Pose Estimation in Computer Vision: A Survey," Pattern Analysis and Machine Intelligence, IEEE Transactions on, vol. 31, no. 4, pp. 607-626, April 2009 (hereinafter, "Murphy-Chutorian"), the contents of which are hereby incorporated herein by reference. Further, head pose estimation module 134 estimates head pose using conventional head pose estimation techniques known to those of ordinary skill in the art, as described, for example, in Murphy-Chutorian.

Head pose estimation module 134 provides estimates of head pose, including the angle of head roll, to gaze estimation module 134.

In some embodiments, head pose may be determined using a sensor attached to the user's head (e.g., head 12), such as a gyroscope and/or an accelerometer. In such embodiments, it is unnecessary to estimate head pose by processing an image of the head, and thus head pose estimation module 134 may be omitted.

Alternatively, in some embodiments, it can be assumed that head 10 does not roll relative to a fixed frame of reference (e.g., the above-noted WCS). In such embodiments, any head roll in the frame of reference of device 100 (e.g., a device coordinate system) can be assumed to be due to rotation of device 100 relative to the fixed frame of reference, which may be measured using gyroscope 108. Thus, in such embodiments, head pose estimation module 134 may be omitted.

Gaze estimation module 136 estimates points-of-gaze using image coordinates of defined eye features provided by eye feature estimation module 132 and estimates of head pose provided by head pose estimation module 134.

Referring again to FIG. 1, as noted, point-of-gaze is estimated as the point of intersection between line v (the visual axis of eye 12) and display 102. As will be appreciated, device 100 estimates point-of-gaze in a frame of reference attached to device 100, e.g., using the direction of the visual axis in a frame of reference attached to device 100. As depicted in FIG. 1, the frame of reference attached to device 100 (and display 102) is a 3D device coordinate system ($X_D$-$Y_D$-$Z_D$), hereinafter referred to as the "DCS").

FIG. 1 also depicts two other coordinate systems. In particular, FIG. 1 depicts a 3D head coordinate system ($X_{HEAD}$-$Y_{HEAD}$-$Z_{HEAD}$) attached to head 10, hereinafter referred to as the "HCS", and a 3D eye coordinate system ($X_{EYE}$-$Y_{EYE}$-$Z_{EYE}$) attached to eye 12, hereinafter referred to as the "ECS". The ECS is defined such that the optical axis of eye 12 coincides with the $Z_{EYE}$-axis.

As will be appreciated, each of the HCS, the ECS, and the DCS may move independently of one another. Further, each of the HCS, the ECS, and the DCS may move relative to the aforementioned fixed WCS (World Coordinate System).

As detailed below, the direction of the visual axis may be estimated in a frame of reference attached to the eye (i.e., in the ECS), which can be denoted by $v_{ECS}$. The direction of the visual axis in the DCS can be determined from $v_{ECS}$ according to:

$$v_{DCS} = R_{HEAD} R_{EYE} v_{ECS}, \quad \text{Equation (1)}$$

where $R_{HEAD}$ is a rotation matrix from the HCS to the DCS and $R_{EYE}$ is a rotation matrix from the ECS to the HCS.

Operation of eye feature estimation module 132 is further described with reference to the ray diagram of FIG. 11. This ray diagram shows eye 12, camera 104 having nodal point 60 and imaging plane 62, and a light source 106 (representative of either one of light sources 106a and 106b), considered to be substantially a point light source.

In this embodiment, camera 104 is a calibrated camera, such that the position and orientation of imaging plane 62 and the position of nodal point 60 with respect to the DCS are known. In addition, the intrinsic parameters of the camera (such as focal length, pixel pitch, lens distortion, etc.) are determined through calibration prior to operation of eye feature estimation module 132. Knowledge of the above-noted camera parameters allows coordinates in the DCS of any pixel in image plane 62 to be calculated.

Camera 104 may be calibrated according to conventional techniques, as described in Z. Zhang, "Flexible Camera Calibration by Viewing a Plane from Unknown Orientations", ICCV, 1999; T. A. Clarke and J. G. Fryer, "The Development of Camera Calibration Methods and Models", Photogrammetric Record, 16(91): 51-66, April 1998; and D. C. Brown, "Close-Range Camera Calibration", Photogrammetric Engineering, pages 855-866, Vol. 37, No. 8, 1971, the contents of which are hereby incorporated herein by reference.

Figure 11:
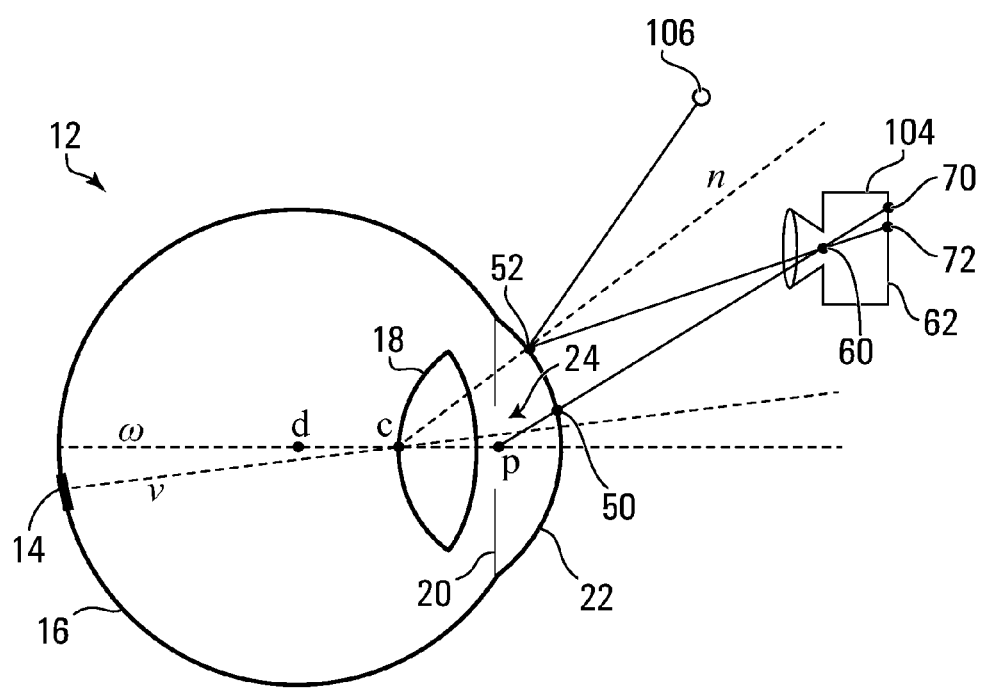
FIG. 11 is a ray diagram showing the user's eye, and a camera and a light source of the estimation device of FIG. 1.

FIG. 11 uses the same model of eye 12 as shown in FIG. 2. Accordingly, as depicted in FIG. 11, the optical axis of eye 12 (ω) is an axis of symmetry of the eye-ball. Further, the center of curvature of the cornea (point c) and the center of the pupil (point p) lie on the optical axis ω. Consequently, the optical axis ω can be estimated by estimating points c and p.

The center of curvature of the cornea c can be estimated as follows. First, consider a ray that originates at a given light source 106 ($L_i$, where i=1 for light source 106a and i=2 for light source 106b) and travels to point of reflection 52 ($q_i$) on the surface of cornea 22 such that the reflected ray goes through nodal point 60 (o) of camera 104, and intersects camera image plane 62 of camera 104 at point 72 ($u_i$). Then, $q_i$ can be expressed as:

$$q_i = o + k_{q,i} \frac{o - u_i}{\|o - u_i\|} \quad \text{Equation (2)}$$

where $k_{q,i}$ represents the distance between point of reflection 52 ($q_i$) and nodal point 60 (o) of camera 104.

According to the law of reflection, the incident ray, the reflected ray, and the normal at the point of reflection, $n_{q,i}$, (line n in FIG. 11) are coplanar, and further the normal at the point of reflection, $n_{q,i}$, is a bisector of an angle $L_i$–$q_i$–o.

Accordingly, $$n_{q,i} = \frac{L_i - q_i}{\|L_i - q_i\|} + \frac{o_i - q_i}{\|o_i - q_i\|}, \quad \text{Equation (3)}$$

Since any normal to a spherical surface passes through its center, the center of curvature of the cornea, c is given by:

$$c = q_i - R \frac{n_{q,i}}{\|n_{q,i}\|}, \quad \text{Equation (4)}$$

where R is the radius of corneal curvature that can be estimated during an initial user calibration performed by user calibration module 138, as detailed below.

It follows from Equation (2), Equation (3), and Equation (4) that for each light source (i=1,2), c can be expressed as a function of one unknown parameter ($k_{q,i}$):

$$c_i = c_i(k_{q,i}). \quad \text{Equation (5)}$$

Since, in principle:

$$c_1(k_{q,1}) = c_2(k_{q,2}), \quad \text{Equation (6)}$$

the unknown parameters can be estimated by solving the following minimization problem:

$$[\hat{k}_{q,1}, \hat{k}_{q,2}] = \operatorname{argmin} \|c_1(k_{q,1}) - c_2(k_{q,2})\|^2. \quad \text{Equation (7)}$$

It will be appreciated that since c is a three-dimensional point, Equation (6) is equivalent to a system of three equations with two unknowns. Thus, it is possible to estimate $\hat{k}_{q,1}$, $\hat{k}_{q,2}$ by solving Equation (7).

Finally, c is obtained as an average of $c_1$ and $c_2$:

$$c = 0.5 * (c_1(\hat{k}_{q,1}) + c_2(\hat{k}_{q,2})). \quad \text{Equation (8)}$$

Next, the pupil center p can be estimated as follows. Consider an imaginary ray that originates at the pupil center, p, travels through the aqueous humour and cornea 22 (effective index of refraction≈1.3375) and refracts at a point of refraction 50 (r) on the surface of cornea 22 as it travels into the air (index of refraction≈1), such that the refracted ray passes through nodal point 60 (o) of camera 104, and intersects image plane 62 of camera 104 at a point 70 ($u_p$).

The condition that the ray coming from point of refraction 50 (r) and passing through nodal point 60 (o) intersects camera image plane 62 at point $u_p$, can be expressed in parametric form as:

$$r = o + k_{ro} \frac{o - u_p}{\|o - u_p\|}, \quad \text{Equation (9)}$$

for some $k_{ro}$.

Furthermore, since the point of refraction 50 (r) is a point on a spherical surface, the following condition must hold:

$$\|r - c\| = R. \quad \text{Equation (10)}$$

Substituting Equation (9) into Equation (10) allows $k_{ro}$ to be solved for, and allows r to be found using Equation (9).

From Snell's Law, it is known that $$n_a \sin \delta_i = n_b \sin \delta_f, \quad \text{Equation (11)}$$

where $n_a$ and $n_c$ are the refractive indices of air and the aqueous humour, respectively, while $\delta_i$ and $\delta_f$ are the angles of the incident and the refracted rays, respectively, with respect to the normal vector, $n_r$, at point of refraction 50 (r).

The normal vector, $n_r$, at point of refraction 50 (r) is given by:

$$n_r = \frac{r - c}{\|r - c\|}. \quad \text{Equation (12)}$$

Further, the direction of the refracted ray, $f_p$, at the point of refraction 50 (r) is given by:

$$f_p = \frac{n_a}{n_b}\left\{i_p - \left((i_p \cdot n_r) + \sqrt{\left(\frac{n_a}{n_b}\right)^2 - 1 + (i_p \cdot n_r)^2}\right)n_r\right\}, \quad \text{Equation (13)}$$

where $i_p$ represents the unit vector in the direction of the incident ray and is given by:

$$i_p = \frac{o - u_p}{\|o - u_p\|}. \quad \text{Equation (14)}$$

Finally, the pupil center p is given by:

$$p = r + k_{rp} f_p, \quad \text{Equation (15)}$$

where $k_{rp}$ is found by using the fact that the distance between p and c is equal to D:

$$\|c - p\| = D, \quad \text{Equation (16)}$$

where D is an eye/user-specific parameter that can be estimated by user calibration module 138 via a user calibration procedure, as described below.

By substituting Equation (15) into Equation (16), $k_{rp}$ can be found. Consequently, p can be estimated using Equation (15).

Given the estimates of c and p, the unit vector in the direction of the optical axis of eye 12 (ω) is given by:

$$\omega = \frac{p - c}{\|p - c\|} \quad \text{Equation (17)}$$

Figure 12:
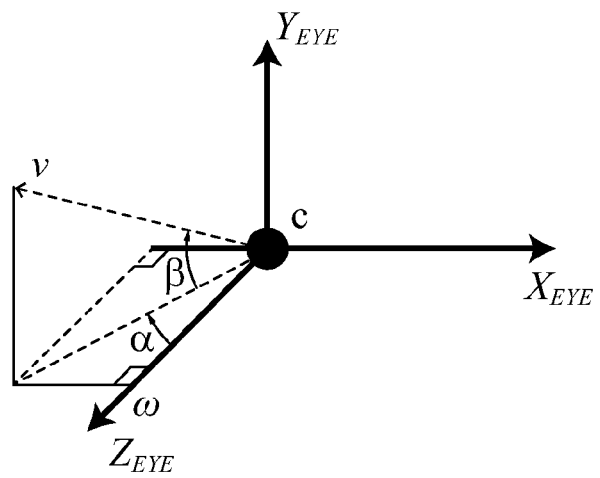
FIG. 12 is a schematic diagram of the visual axis of the user's eye in a frame of reference attached to the eye.

FIG. 12 illustrates the angular offset between the optical and visual axes of an eye (e.g., eye 12) in the ECS. As noted, the ECS is defined such that the $Z_{EYE}$-axis coincides with the optical axis ω of eye 12. In this ECS, the 3D angle between the optical and the visual axes of eye 12 can be expressed by the "horizontal" α and "vertical" β components of this angle. The "horizontal" α component is a 2D angle between the projection of the visual axis on the $X_{EYE}$-$Z_{EYE}$ plane and the $Z_{EYE}$-axis. It is equal to 90° if the visual axis is in the $-X_{EYE}$ direction. The "vertical" component β is a 2D angle between the visual axis and its projection on the $X_{EYE}$-$Z_{EYE}$ plane. It is equal to 90° if the visual axis is in the $+Y_{EYE}$ direction.

Thus, the unit vector in the direction of the visual axis with respect to the ECS, $V_{ECS}$, can be expressed as:

$$V_{ECS} = \begin{bmatrix} -\sin\alpha \cdot \cos\beta \\ \sin\beta \\ \cos\alpha \cdot \cos\beta \end{bmatrix}. \quad \text{Equation (18)}$$

The values of α and β are eye/user-specific, and can be estimated by a user calibration procedure performed by user calibration module 138, as described below.

As will be appreciated, the angle between the optical and visual axes remains constant in the ECS despite rotations or translations with respect to the DCS. Therefore, $V_{ECS}$ also remains constant in the ECS despite rotations or translations with respect to the DCS.

Equation (1) requires the calculation of two rotation matrices, namely, $R_{HEAD}$ and $R_{EYE}$. However, this approach can be simplified by assuming that the ECS and the HCS coincide such that a single rotation matrix can be used to transform the direction of the visual axis in the ECS to the direction of the visual axis in the DCS. For example, under this assumption, $R_{HEAD}$ can be deemed to be the identity matrix such that $R_{EYE}$ alone can be used to make the required transformation.

Accordingly, the unit vector in the direction of the visual axis with respect to the DCS, $V_{DCS}$, can be determined by:

$$V_{DCS} = R_{EYE} V_{ECS}. \quad \text{Equation (19)}$$

Figure 13:
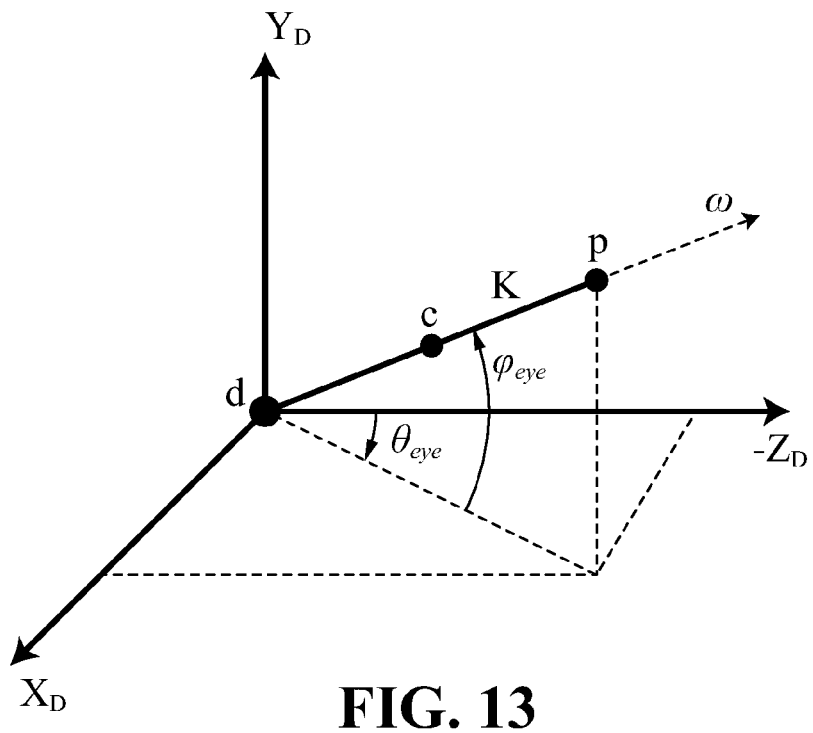
FIG. 13 is a schematic diagram of the optical axis of the user's eye in a frame of reference attached to the estimation device of FIG. 1.

This $R_{EYE}$ can be calculated using angles of rotation of the optical axis ω with respect to the DCS and an estimate of an angle of a roll of the eye around the optical axis ω as measured in the DCS. In particular, the optical axis can be expressed as:

$$\omega = \begin{bmatrix} \cos\varphi \cdot \sin\theta \\ \sin\varphi \\ -\cos\varphi \cdot \cos\theta \end{bmatrix}, \quad \text{Equation (20)}$$

where θ and φ are the horizontal (yaw) and vertical (pitch) angles of rotation, respectively, of the optical axis ω with respect to the DCS, as illustrated in FIG. 13. The angles θ and φ can be easily calculated using Equation (17) and Equation (20).

Further, the rotation matrix $R_{EYE}$ (from the ECS to the DCS) can be found as follows:

$$R_{eye} = R_{flip} R_\theta R_\varphi R_\kappa, \text{ where} \qquad \text{Equation (21)}$$

$$R_{flip} = \begin{pmatrix} -1 & 0 & 0 \\ 0 & 1 & 0 \\ 0 & 0 & -1 \end{pmatrix}$$

represents reversal of the "X" and "Z" axes of ECS with respect to the DCS;

$$R_\theta = \begin{pmatrix} \cos\theta & 0 & -\sin\theta \\ 0 & 1 & 0 \\ \sin\theta & 0 & \cos\theta \end{pmatrix}$$

represents the rotation of the eye around the "$Y_D$" axis (yaw);

$$R_\varphi = \begin{pmatrix} 1 & 0 & 0 \\ 0 & \cos\varphi & \sin\varphi \\ 0 & -\sin\varphi & \cos\varphi \end{pmatrix}$$

represents the rotation of the eye around the "$X_D$" axis (pitch); and $$R_\kappa = \begin{pmatrix} \cos\kappa & -\sin\kappa & 0 \\ \sin\kappa & \cos\kappa & 0 \\ 0 & 0 & 1 \end{pmatrix}$$

represents the rotation of the eye around the "Z" axis (roll, torsion), with angle κ being an angle of eye roll.

As will be appreciated, eye roll, being rotation of the eye around the optical axis is not readily observable from the direction of the optical axis. Thus, for convenience, the angle κ above can be assumed to be equal to the angle of the head roll as measured in the DCS. Gaze estimation module 136 can obtain an estimate of this angle of head roll from head pose estimation module 134. In this way, gaze estimation module 136 accounts for eye/head rolls when estimating point-of-gaze.

Alternatively, in situations where it can be assumed that head 10 does not roll relative to the fixed WCS, any head roll in the DCS can be assumed to be due to rotation of device 100 relative to the WCS. In other words, if device 100 is rotated with respect to the WCS while head 10 remains stationary in the WCS, then head 10 appears to be rotated in the DCS in the direction opposite to the rotation of device 100 relative to the WCS. The angle of rotation of device 100 around the $Z_D$-axis of the DCS can be determined using measurements obtained from gyroscope 108 by way of gyroscope interface 116. This angle of rotation of device 100 can be used as a proxy for the angle κ above (with an opposite sign).

In alternate embodiment, $R_{EYE}$ may be calculated without obtaining any estimate of eye/head roll. In this embodiment, device 100 uses estimates of the center of corneal curvature of the user's left and right eyes to estimate $R_{EYE}$.

According to this embodiment, the ECS is defined such that:

$$Z_{ECS} = \omega. \qquad \text{Equation (22)}$$

Let $C_L$ and $C_R$ denote the center of corneal curvature of the left and right eyes, respectively. $C_L$ and $C_R$ can be calculated in the manner set out above, e.g., using Equation (8). $Y_{ECS}$ can then be defined as a unit vector in the direction of the normal of the plane spanned by $Z_{ECS}$ and a vector connecting $C_R$ and $C_L$:

$$Y_{ECS} = \frac{Z_{ECS} \times \overrightarrow{C_R C_L}}{\|Z_{ECS} \times \overrightarrow{C_R C_L}\|}. \qquad \text{Equation (23)}$$

Finally, $X_{ECS}$ is calculated as a third vector such that the ECS is a Cartesian, right-handed coordinate system:

$$X_{ECS} = \frac{Y_{ECS} \times Z_{ECS}}{\|Y_{ECS} \times Z_{ECS}\|}. \qquad \text{Equation (24)}$$

$R_{EYE}$ can then be calculated as:

$$R_{EYE} = [X_{ECS} Y_{ECS} Z_{ECS}]. \qquad \text{Equation (25)}$$

As will be appreciated, $X_{ECS}$, $Y_{ECS}$ and $Z_{ECS}$ are respectively the 3×1 column unit vectors in the direction of the $X_{EYE}$, $Y_{EYE}$, and $Z_{EYE}$ axes of the ECS with respect to the DCS, as defined in equations Equation (22), Equation (23), and Equation (24).

$V_{DCS}$ can then be calculated using Equation (19).

As the visual axis goes through the center of curvature of the cornea c, the point-of-gaze (PoG) in the DCS is given by:

$$PoG = c + \tau V_{DCS}, \qquad \text{Equation (26)}$$

where τ is a line parameter defined by the intersection of the visual axis with display 102.

For example, assuming that display 102 is a plane defined by $\{x : n \cdot x + h = 0\}$, then τ will be given by:

$$\tau = \frac{h + n \cdot c}{n \cdot v_{DCS}}, \qquad \text{Equation (27)}$$

where n is the normal to the display surface.

Gaze estimation module 136 outputs the calculated point-of-gaze PoG. Optionally, the calculated PoG may be stored in memory 112.

Figure 14:
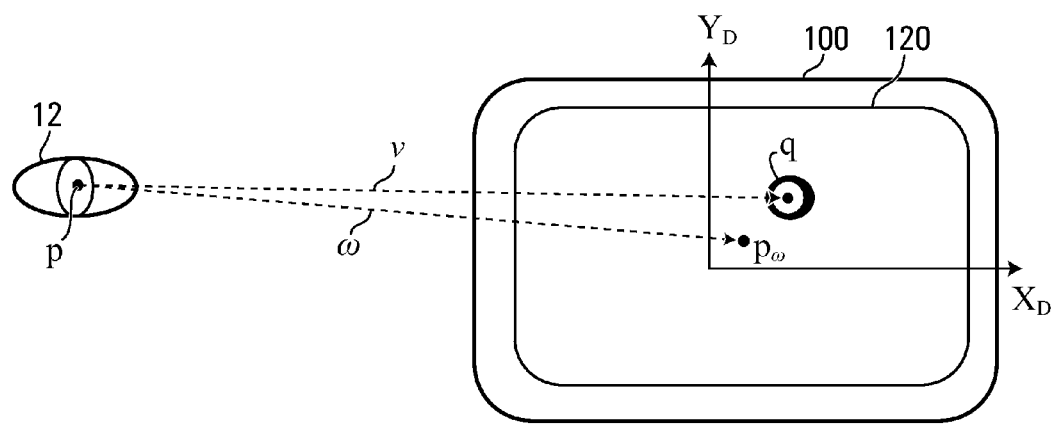
FIG. 14 is a schematic diagram of the user's eye looking at the estimation device of FIG. 1 during user calibration.

User calibration module 138 may perform an initial user calibration to determine eye/user-specific parameters used during point-of-gaze estimation. In particular, as depicted in FIG. 14, a visible target q, is presented on display 102 at a known location in the DCS of device 100, and the user is asked to look at the target q. This may be repeated for a plurality of known calibration targets $q_i$, $i = 1 \ldots N$ displayed (in a sequence) at known positions.

Further, as described above, gaze estimation module 136 uses four eye/user-specific parameters of eye 12 to estimate point-of-gaze. Specifically, gaze estimation module 136 uses the radius of curvature of the cornea R, the distance between the center of the cornea and the center of the pupil D, and the horizontal and vertical offsets, α and β, respectively, between the optical and visual axes of eye 12.

These eye/user-specific parameters may be estimated such as to minimize the error between the estimates of the point-of-gaze and respective calibration targets, according to:

$$[\hat{R}, \hat{D}, \hat{\alpha}, \hat{\beta}] = \operatorname{argmin} \sum_{i=1}^{N} \|g_i(R, D, \alpha, \beta) - q_i\|^2, \quad \text{Equation (28)}$$

where $g_i$ is an estimate of point-of-gaze as a function of R, D, α and β determined in manners described above. In particular, an image of at least a part of the user's head including eye 12 is captured while the user is looking at a particular target $q_i$; coordinates in the image of pre-defined eye features (e.g., the pupil center and corneal reflections) are determined by eye feature estimation module 132; head pose is determined using head pose estimation module 134, and $g_i$ is estimated using gaze estimation module 136. Equation (28) may be solved using robust estimation techniques known to those of ordinary skill in the art to reduce sensitivity to possible outliers.

User calibration module 138 may be omitted in embodiments that rely on pre-determined values in lieu of calibrated parameters. Such pre-determined values may be population-average values or other default values apparent to the skilled person. These values may, for example, be stored in memory 112.

ICS transformation module 140 transforms coordinates in the DCS to a 2D image coordinate system of display 102 of device 100, hereinafter referred to as the "ICS". In particular, ICS transformation module 140 receives input in the form of coordinates in the DCS, and provides output in the form of transformed coordinates in the ICS of display 102.

For example, ICS transformation module 140 may be used to transform coordinates of a point-of-gaze estimated in the DCS (e.g., as provided by gaze estimation module 136) to the ICS. In this way, point-of-gaze estimates may be expressed in coordinates in the ICS. For example, this allows point-of-gaze estimates to be considered relative to a digital image displayed on display 102.

Figure 16A:
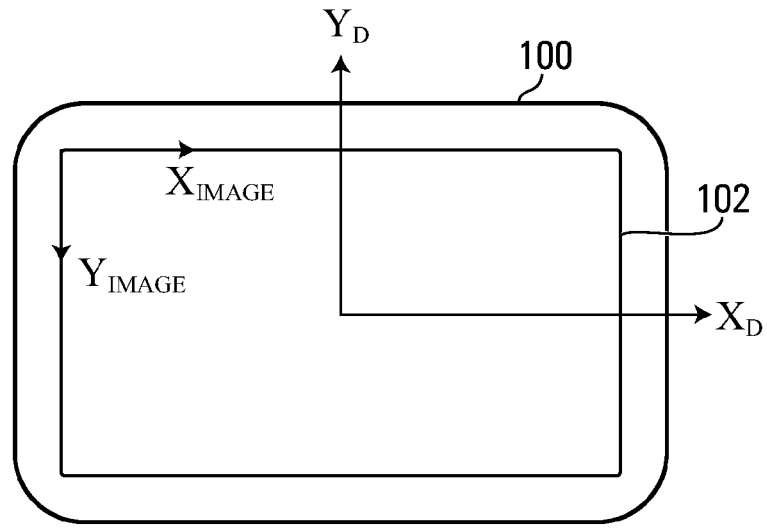
FIG. 16A is a schematic diagram of an image coordinate system of a display of an estimation device.
Figure 16B:
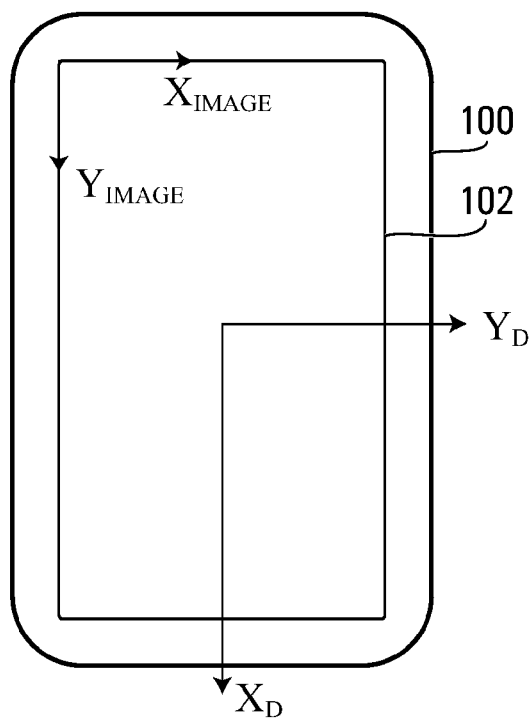
FIG. 16B is a schematic diagram of an alternate image coordinate system of the display of FIG. 16A.

FIGS. 16A and 16B respectively depict two examples of the ICS ($X_{IMAGE}$-$Y_{IMAGE}$) of display 102. As is conventional, in these examples, the origin of the ICS is located in the upper-left corner, and coordinates are measured in pixels. The ICS of display 102 may not be aligned with the DCS of device 100; for example, in the ICS depicted in FIG. 16B, the $X_{IMAGE}$-axis is not aligned with the $X_D$-axis of the DCS and the $Y_{IMAGE}$-axis is not aligned with the $Y_D$-axis of the DCS.

Furthermore, the ICS of display 102 may change dynamically relative to the DCS during operation of device 100. Such a change may occur, for example, when device 100 is rotated relative to the fixed WCS (World Coordinate System). For example, the ICS may change from the ICS depicted in FIG. 16A to the ICS depicted in FIG. 16B, or vice versa, after device 100 has been rotated 90 degrees.

In some embodiments, ICS transformation module 140 may receive an indicator indicating the current ICS of display 102, or indicating a change in the current ICS of display 102, e.g., upon rotation of device 100. In some embodiments, ICS transformation module 140 may instead receive an indicator indicating that device 100 has been rotated, and ICS transformation module 140 determines the current ICS based on the indicated rotation. These indicators may, for example, be received by ICS transformation module 140 from operating system 120 (FIG. 6).

ICS transformation module 140 transforms coordinates in the DCS (e.g., a point-of-gaze, $PoG_{DCS}$) to coordinates in the ICS (e.g., a point-of-gaze, $PoG_{ICS}$) as follows:

$$PoG_{ICS} = o_{DCS} + R_{ICS} R_{pp} PoG_{DCS}, \quad \text{Equation (29)}$$

where:
$o_{DCS}$ is the position of the origin of the DCS as measured in the ICS (in the units of the ICS, e.g., pixels);
$R_{pp}$ is a matrix representing a scaling factor from the unit of measure of the DCS to the unit of measure in the ICS; for example, if $PoG_{DCS}$ is given in millimeters, while the units of the ICS are pixels, then $$R_{pp} = \begin{pmatrix} 1/pp_x & 0 \\ 0 & 1/pp_y \end{pmatrix},$$

where $pp_x$ and $pp_y$ are the x- and y-dimensions of a single pixel in mm (also referred to as "pixel pitch"); and
$R_{ICS}$ is the rotation matrix from the DCS to ICS; for example, for the DCS/ICS illustrated in FIG. 16A, $$R_{ICS} = \begin{pmatrix} 1 & 0 \\ 0 & -1 \end{pmatrix},$$

and for the DCS/ICS illustrated in FIG. 16B, $$R_{ICS} = \begin{pmatrix} 0 & 1 \\ 1 & 0 \end{pmatrix}.$$

As noted, ICS transformation module 140 outputs the calculated $PoG_{ICS}$. Optionally, the $PoG_{ICS}$ may be stored at device 100, e.g., in memory 112. Optionally, the $PoG_{ICS}$ may be provided by gaze estimation software 130 to other applications (not shown) executing on device 100. Such applications may, for example, use the $PoG_{ICS}$ to analyze visual and oculomotor functionality, analyze reading behavior or visual scanning behaviour, or the like. Optionally, the calculated $PoG_{ICS}$ may be provided to operating system 120, for use in controlling device 100. For example, the calculated $PoG_{ICS}$ may be used as a proxy for the position of a user's touch on display 102 and/or the position of a mouse cursor. Conveniently, estimating point-of-gaze in manners described herein (i.e., accounting for rotations of head 10 and/or rotations of device 100) allows point-of-gaze to be estimated in more natural settings.

In some embodiments, gaze estimation software 130 may simply store/provide point-of-gaze in the device coordinate system. In such embodiments, ICS transformation module 140 may be omitted.

Figure 17:
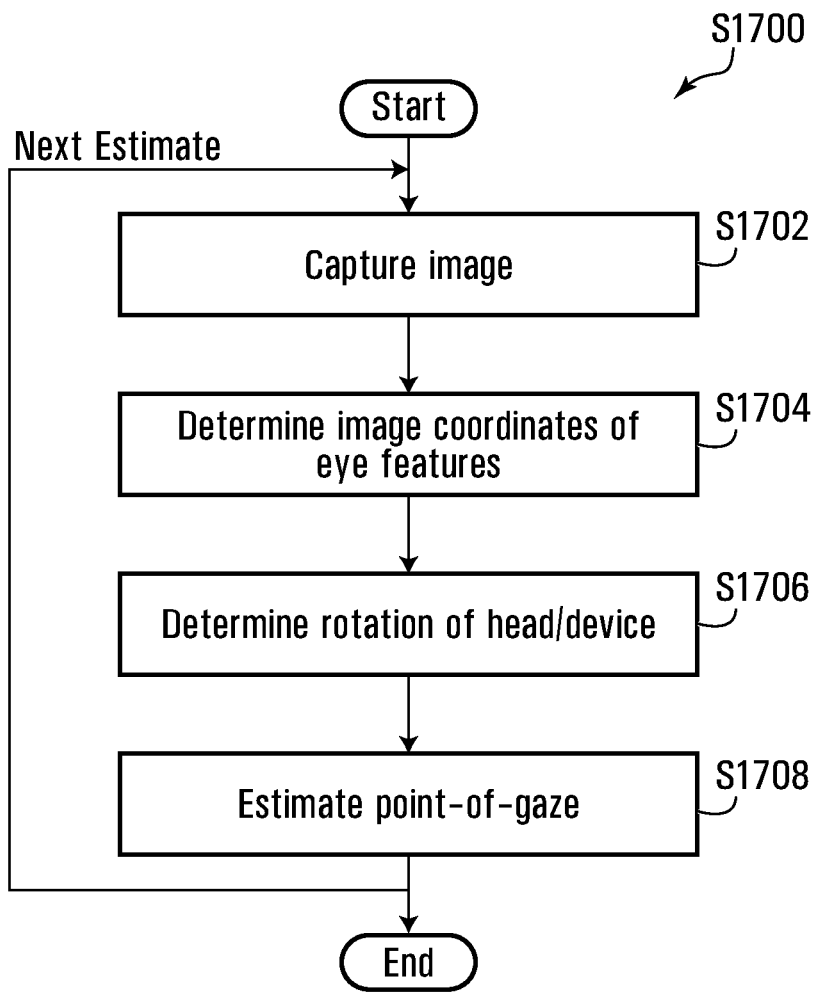
FIG. 17 is a flowchart depicting exemplary blocks performed at the estimation device of FIG. 1.

The operation of gaze estimation software 130 is further described with reference to the flowchart illustrated in FIG. 17. Gaze estimation software 130 performs blocks S1700 and onward at device 100. First, an initial user calibration is performed by user calibration module 138 to obtain eye/subject-specific parameters (e.g., the radius of curvature of the cornea R, the distance between the center of the cornea and the center of the pupil D, and the horizontal and vertical offsets, α and β, respectively). Initial user calibration can be skipped if parameters have previously already been calibrated for a particular user and stored at device 100, e.g., in memory 112, or if population-averages are used.

Once the eye/subject-specific parameters have been determined, at block S1702, an image is captured using video camera 104 of device 100. This image includes at least eye 12 such the eye features (e.g., the pupil center and two corneal reflections) used to estimate point-of-gaze can be found, and at least a part of head 10 such that sufficient head features can be found to allow head pose estimation to be performed.

At block S1704, the image captured at block S1702 is provided to eye feature estimation module 132. Eye feature estimation module 132 processes the image to determine image coordinates of the defined eye features used by gaze estimation module 136. For example, eye feature estimation module 132 processes the image to determine the image coordinates of the pupil center and two corneal reflections of eye 12.

Next, at block S1706, the image captured at block S1702 is provided to head pose estimation module 134. Head pose estimation module 134 estimates the head pose, including at least an angle of head roll. Alternatively, if it can be assumed that head 10 does not rotate relative to the fixed WCS, then head pose estimation module 134 need not be invoked and an equivalent device roll can be obtained from gyroscope 108 by way of gyroscope interface 116.

Once head/device roll has been determined, point-of-gaze is estimated at block S1708. In particular, gaze estimation module 136 receives the image coordinates of defined eye features from eye feature estimation module 132. Gaze estimation module 136 also receives the estimated head rotation from head pose estimation module 134 or, equivalently, the measured device rotation from gyroscope 108. Point-of-gaze is estimated by gaze estimation module 136 using the received image coordinates of defined eye features and the head/device rotation. Optionally, at block S1708, the point-of-gaze estimated by gaze estimation module 136 may be converted to the ICS of display 12 by ICS Transformation Module 140.

Blocks S1702 through S1708 may be repeated for each image captured by video camera 104 to estimate a point-of-gaze for each image. As will be appreciated, in this way, many estimates of point-of-gaze may be determined each second, with the frequency of estimation being primarily limited by the frame rate of video camera 104 and the processing capabilities of processor 110. Thus, in some embodiments, estimation device 100 may be used as part of a real-time application.

Further, as will be appreciated, since gaze estimation software 130 takes into account the rotation of head 10 and/or the rotation of device 100, accuracy of point-of-gaze estimates may be maintained even if head 10 and/or device 100 rotate during operation, from one estimate to the next.

In the embodiment of gaze estimation module 136 described above, a single rotation matrix, namely, $R_{EYE}$ is used to transform the direction of the visual axis in the ECS to the direction of the visual axis in the DCS. As noted, this requires an assumption that the ECS and the HCS coincide such that $R_{HEAD}$ is an identity matrix. In an alternate embodiment, gaze estimation module 136 may be modified to separately determine $R_{HEAD}$ and $R_{EYE}$ such that the above assumption may be avoided. In other words, the visual axis in the DCS ($V_{DCS}$) can be determined according to Equation (1), repeated below for reference:

$$v_{DCS} = R_{HEAD} R_{EYE} v_{ECS} \qquad \text{Equation (30)}$$

An estimate of $v_{ECS}$ may be determined during an initial user calibration performed by user calibration module 138, as discussed below.

As before, the ECS ($X_{EYE}$-$Y_{EYE}$-$Z_{EYE}$) is defined such that the $Z_{EYE}$-axis coincides with the optical axis of the eye. Therefore, the rotation matrix $R_{EYE}$ from the HCS to the ECS can be found as:

$$R_{EYE} = R_\theta R_\phi, \qquad \text{Equation (31)}$$

where $R_\theta$ and $R_\phi$ represent the rotations around the $Y_{HEAD}$ and $X_{HEAD}$ axes, respectively, necessary such that $\omega_{ECS} = R^T_{EYE} \omega_{HCS}$ is parallel to $Z_{EYE}$ ($^T$ denotes matrix transpose).

The rotation matrix $R_{HEAD}$ from the HCS to the DCS is obtained using head pose estimation module 134 for a given orientation of head 10. Head pose estimation module 134 is thus modified to provide an estimate $R_{HEAD}$, rather than simply an estimate of head roll of head 10. Head pose estimation module 134 can estimate $R_{HEAD}$ according to any of the approaches discussed in Murphy-Chutorian, or any other approaches known to those of ordinary skill in the art.

Once $R_{HEAD}$, $R_{EYE}$, and $v_{ECS}$ have been determined, $v_{DCS}$ can be calculated using Equation (30). Point-of-gaze in the DCS can then be determined using Equation (26) and Equation (27).

In situations where it can be assumed that head 10 does not roll relative to the fixed WCS, then the rotation matrix representing the orientation of the DCS relative to the fixed WCS, $R_{DEVICE}$, can be used instead of $R_{HEAD}$. In particular, Equation (1) may be replaced with:

$$v_{DCS} = R^T_{DEVICE} R_{EYE} v_{ECS}. \qquad \text{Equation (32)}$$

Of course, if the ECS and HCS are assumed to be coincident, $R_{EYE}$ can be assumed to be an identity matrix such that:

$$v_{DCS} = R^T_{DEVICE} v_{ECS}. \qquad \text{Equation (33)}$$

The rotation matrix $R_{DEVICE}$ may be calculated using measurements of the orientation of device 100 in the WCS, using measurements obtained from gyroscope 108 by way of gyroscope interface 116.

As noted, the direction of the visual axis in the ECS, namely, $V_{ECS}$, is an eye/user-specific parameter determined during an initial user calibration performed by user calibration module 138. User calibration module 138 may be modified to determine $V_{ECS}$ in the following manner.

Having reference again to FIG. 14, as before, a visible target q is presented on display 102 at a known location in the DCS of device 100, and the user is asked to look at the target q. Under the assumption that user is looking at a target, the direction of the visual axis in the device coordinate system is given by:

$$v_{DCS} = \frac{q - c}{\|q - c\|}. \qquad \text{Equation (34)}$$

Combining Equation (30) and Equation (34), provides:

$$\frac{q - c}{\|q - c\|} = R_{HEAD} R_{EYE} V_{ECS}. \qquad \text{Equation (35)}$$

Therefore:

$$V_{ECS} = R^T_{EYE} R^T_{HEAD} \frac{q - c}{\|q - c\|}. \qquad \text{Equation (36)}$$

In a further alternate embodiment, gaze estimation module 136 may be modified to estimate point-of-gaze without explicit estimation in 3D space of the visual axis, or the angular offset between the optical and visual axes. Rather, a linear offset on display 102 is calculated.

Figure 15:
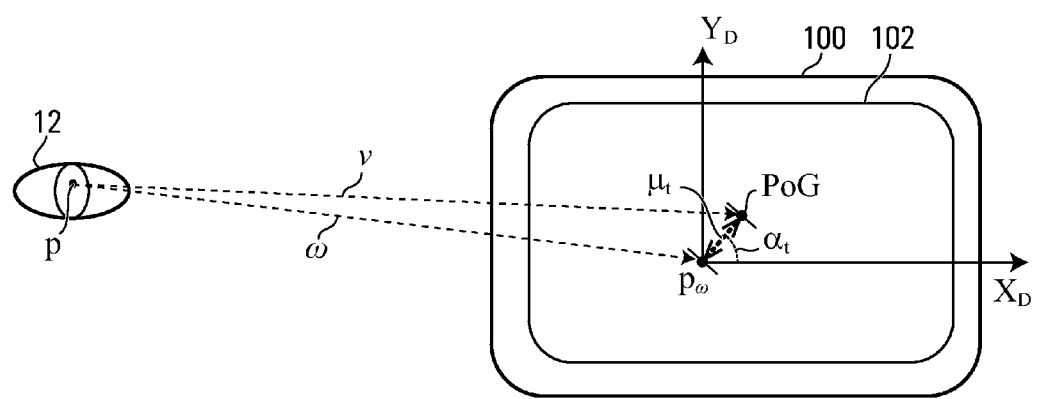
FIG. 15 is a schematic diagram of an estimation device estimating the point-of-gaze of a user looking towards the device, exemplary of an alternate embodiment.

This embodiment is further described with reference to FIG. 15. First, an estimate of the optical axis (line ω) in 3D space in the DCS is determined, in manners described above. Then, an approximation of point-of-gaze is determined as the intersection of the optical axis with display 102 of device 100. This approximation is shown as $p_\omega$ in FIG. 15.

The point-of-gaze (PoG) is calculated by applying a linear offset to the approximation $p_\omega$. As depicted, this linear offset has a length $\mu_t$ in the direction equivalent to an angle $\alpha_t$ relative to the $X_D$-axis in the $X_D$-$Y_D$ plane of the DCS. Thus, the point-of-gaze may be calculated as:

$$PoG = p_\omega + \mu_t \begin{bmatrix} \cos(\alpha_t) \\ \sin(\alpha_t) \end{bmatrix}.\qquad\text{Equation (37)}$$

Further, the distance $\mu_t$ can be scaled by the relative distance of eye 12 to device 100. For example, if the distance between eye 12 to device 100 is estimated as $k_0$ during an initial user calibration performed by user calibration module 138, and as $k_t$ at time t, then the length of the offset $\mu_t$ applied to produce an estimate of PoG at time t is given by:

$$\mu_t = \mu_0 * k_t/k_0,\qquad\text{Equation (38)}$$

where $\mu_0$ is the distance between points $p_\omega$ and q (FIG. 14) measured during the initial user calibration.

The angle $\alpha_t$ is adjusted based on the rotation of head 10 relative to device 100, or alternatively rotation of device 100 relative to head 10 and/or the fixed WCS. Specifically, let $\alpha_0$ denote an angle between a vector $\overrightarrow{p_\omega q}$ and $X_D$-axis (FIG. 14) as measured during the initial user calibration. Then:

$$\alpha_t = \alpha_0 + \Delta\alpha,\qquad\text{Equation (39)}$$

where $\Delta\alpha$ represents the change from the time of an initial user calibration to time t in the tilt of head 10 (i.e., roll of head 10 around the $Z_{HEAD}$-axis), as measured in the DCS. The angle of head tilt for a given orientation of head 10 during initial user calibration and at each subsequent time t can be determined using head pose estimation module 132.

Alternatively, in situations where it can be assumed that head 10 does not roll relative to the fixed WCS, $\Delta\alpha$ can be calculated as a change in the rotational angle of device 100 around the $Z_D$-axis, as measured in the WCS. This change in the rotational angle may be calculated using measurements obtained from gyroscope 108 by way of gyroscope interface 116 (e.g., during initial user calibration and at time t).

As noted, estimating point-of-gaze using Equation (37) requires the values of $\alpha_0$ and $\mu_0$. Thus, user calibration module 138 may be modified to measure these values during an initial calibration procedure. Alternatively, default values of $\alpha_0$ and $\mu_0$ (e.g., population-average values) may be used instead. In this case, an initial user calibration may be avoided.

In yet another embodiment, gaze estimation module 136 may be modified to estimate point-of-gaze without explicit estimation in 3D space of the optical axis, the visual axis, or the angular offset therebetween. Rather, a linear offset on display 102 is calculated. As such, in this embodiment, camera 104 does not need to be calibrated in manners discussed above. As further detailed below, in this embodiment, point-of-gaze is estimated using a mapping between a vector in the image plane 62 of camera 104 (FIG. 11) and a point-of-gaze on display 102. In particular, this vector in image plane 62 is the vector connecting pupil center 70 (FIG. 11) at point $u_p$ and corneal reflection 72 (FIG. 11) generated by light source i at point $u_i$.

This vector may be described as:

$$\Delta u = u_p - u_i.\qquad\text{Equation (40)}$$

In the absence of movement of head 10 or device 100 (FIG. 1), the point-of-gaze (PoG) can be expressed as a function of $\Delta u$ only:

$$PoG = f(\Delta u).\qquad\text{Equation (41)}$$

The function in Equation (41) can be approximated with a polynomial of nth degree. In many applications, a first order polynomial often provides point-of-gaze estimates of sufficient accuracy. Thus, point-of-gaze can be expressed as $$PoG = M\Delta u + b\qquad\text{Equation (42)}$$

where M is 2×2 matrix, representing a "gain" (multiplicative) factor, and b is 2×1 vector that represents a linear offset.

However, in presence of movements of head 10 or device 100 (FIG. 1), estimating point-of-gaze according to Equation (42) may result in significant errors. The main reason for these errors is scaling (magnification/demagnification) of $\Delta u$ (pupil center–corneal reflection vector) as the distance between eye 12 and camera 104 changes (specifically, in the "depth" direction). To mitigate the effect of movements of head 10 and/or device 100, a scaling factor can be introduced into Equation (42) as follows:

$$PoG = \gamma M \Delta u + b.\qquad\text{Equation (43)}$$

Specifically, the scaling factor $\gamma$ can be a function of the distance between eye 12 and camera 104, which can be estimated, for example, using techniques similar to those described above for estimating the optical axis. For example, where d is the center of the eye-ball, and $d_z$ is the "depth" component of the vector $\Delta u$ in the camera coordinate system, then:

$$\gamma = (d_z)^2.\qquad\text{Equation (44)}$$

In some embodiments, device 100 may include a depth-sensing camera/3D camera operable to estimate the distance between eye 12 and camera 104.

The effect of magnification/demagnification as eye 12 moves towards/away from camera 104 is thus compensated by multiplying the vector $\Delta u$ by the scaling factor $\gamma$.

Alternatively, in embodiments where device 100 includes two or more light-sources (e.g., light sources 106a/106b), vector $\Delta u$ can be normalized by the distance between the two corneal reflections respectively generated by the two light sources in the image. Namely $\gamma$ can be calculated according to:

$$\gamma = \frac{1}{\|u_1 - u_2\|}.\qquad\text{Equation (45)}$$

Further, the offset b of Equation (43) can be adjusted to account for rotations of head 10 or eye 12 relative to the device coordinate system of device 100 (or rotations of device 100 relative to head 10/eye 12; FIG. 1). This requires the light source generating the corneal reflection used for $\Delta u$ (e.g., one of light sources 106a or 106b of FIG. 1) to be located in close proximity to the optical axis of camera 104. In this case, let $b_{LS}$ denote the coordinate of the center of the light source associated with $\Delta u$ in the device coordinate system of device 100 (DCS). Offset b of Equation (43) can be separated into a "system-specific" component ($b_{LS}$) and "user-specific" component ($b_u$) as follows:

$$b = b_{LS} + b_u, \qquad \text{Equation (46)}$$

such that:

$$b_u = b - b_{LS}. \qquad \text{Equation (47)}$$

Next, let κ denote an angle of the eye (head) roll with respect to the DCS. To compensate for the eye (head) roll relative to the DCS, Equation (43) becomes:

$$PoG = \gamma M \Delta u + b_{LS} + R b_u, \qquad \text{Equation (48)}$$

where:

$$R = \begin{pmatrix} \cos\kappa & \sin\kappa \\ -\sin\kappa & \cos\kappa \end{pmatrix}. \qquad \text{Equation (49)}$$

In Equation (48), only the "user-specific" component of the offset b, i.e., $b_u$ is subject to compensation for the rotation of device 100 or head 10/eye 12 of the user. The "system-specific" component of the offset, i.e., $b_{LS}$, is substantially due to the position of the light source associated with Δu with respect to the origin of the DCS, and as such, is not subject to rotation compensation.

As noted above, eye roll is not readily observable. Thus, the angle κ can be assumed to be equal to the angle of head roll as measured in the DCS. Gaze estimation module 136 can obtain an estimate of the angle of head roll from head pose estimation module 134, in manners detailed above.

Alternatively, in situations where it can be assumed that head 10 does not roll relative to the fixed WCS, the angle of rotation of device 100 around $Z_D$ axis of the DCS can be determined from gyroscope 108 by way of gyroscope interface 116. This angle of rotation of device 100 can be used as a proxy for the angle κ above (with an opposite sign).

The "user-specific" component of the offset b, i.e., $b_u$, can be further adjusted to compensate for head movements. In particular, $b_u$ can be adjusted to compensate to the magnification/demagnification effect due to the change in the depth of the position of eye 12 relative to device 100. In particular, since this depth is proportional to the square root of the scaling factor γ, Equation (48) can be modified to be:

$$PoG = \gamma M \Delta u + b_{LS} + \sqrt{\frac{\gamma}{\gamma_o}} R b_u, \qquad \text{Equation (50)}$$

where $\gamma_o$ is the value of the scaling factor γ as measured during initial user calibration during which the offset b was estimated, as detailed below.

The estimation of point-of-gaze according to Equation (48) or Equation (50) requires knowledge of matrix M and an offset vector b, which are user-specific parameters. Accordingly, user calibration module 136 is modified to obtain matrix M and an offset vector b. In particular, user calibration module 136 is modified to obtain estimates of M and b that minimize the error between the estimates of the point-of-gaze and respective calibration targets:

$$[\hat{M}, \hat{b}] = \mathrm{argmin} \sum_{i=1}^{N} \| PoG_i(M, b) - q_i \|^2, \qquad \text{Equation (51)}$$

where $q_i$, i=1 ... N, is the location of N calibration targets, displayed in sequence at known positions on display 102. Equation (51) may be solved using robust estimation techniques known to those of ordinary skill in the art to reduce sensitivity to possible outliers.

Alternatively, M and b can be assumed to be equal to population average values, or otherwise obtained prior to operation of device 100. As noted above, the "system-specific" component of b (i.e., $b_{LS}$) is known. Thus, the "user-specific" component of b (i.e., $b_u$) can be determined from the calibrated value of b using Equation (47).

User calibration module 136 is also modified to obtain the value of $\gamma_o$, noted above, during an initial user calibration.

An example approach for determining the optical axis has been detailed herein. However, in other embodiments, the direction of the optical axis can be determined by any of the approaches described in Shih 2000, Shih 2004, Guestrin 2006, Guestrin 2008, Guestrin 2010, Wang 2002, Wang 2001, Trucco 2005, and Amir. Other approaches for determining the direction of the optical axis known to those of ordinary skill in the art may also be used.

In some embodiments, device 100 may estimate point-of-gaze from both eyes of a user, e.g., using image coordinates of defined eye features for both eyes, as determined by eye feature estimation module 132.

In some embodiments, device 100 may include video cameras in addition to video camera 104. For example, in an embodiment, device 100 may include an additional video camera such that a dedicated camera can be used for each eye. As will be appreciated, this allows each eye to be imaged in greater detail, which in turn allows eye features to be estimated with greater accuracy/precision. Alternatively, in another embodiment, two cameras may be used to capture images of the same eye, to allow the optical axis of that eye to be estimated using stereoscope estimation techniques, as described in the references listed hereinabove. In some embodiments, device 100 may include a dedicated video camera for capturing images used to estimate head pose. Such a camera may be a depth-sensing/3-D camera.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of estimating point-of-gaze of a user looking at a display, said method comprising:
   capturing an image of an eye of said user using a camera, said camera interconnected to at least one processor;
   processing said image using said at least one processor to determine coordinates in said image of a plurality of defined eye features sufficient to determine the optical axis of said eye of said user;
   determining at least one angle proportional to an angle between (i) a line coincident with an edge of said display and (ii) an intersection of the sagittal plane of the head of said user with a plane of said display; and
   estimating an intersection of the line-of-sight of said eye of said user with said plane of said display, using the optical axis of said eye, and using said at least one angle to account for rotation of said head of said user or said display.

2. The method of claim 1, wherein said image is captured to include a plurality of defined head features, and said method further comprises processing said image to determine coordinates in said image of said plurality of defined head features and calculating said at least one angle using said coordinates in said image of said plurality of defined head features.

3. The method of claim 1, wherein said determining comprises receiving an indicator of said at least one angle from at least one sensor attached to said display or attached to the head of said user.

4. The method of claim 1, further comprising determining an angle between the optical axis of said eye of said user and the line-of-sight of said eye of said user.

5. The method of claim 4, wherein said angle between the optical axis and the line-of-sight of said eye of said user is determined at least in part using a predetermined angle reflective of a population average.

6. The method of claim 4, wherein said angle between the optical axis and the line-of-sight of said eye of said user is calibrated for said user.

7. The method of claim 1, wherein said estimating comprises:
determining the optical axis of said eye of said user using said coordinates in said image of said plurality of defined eye features;
calculating a corrective angular offset using said angle between the optical axis and the line-of-sight of said eye of said user and said at least one angle; and
applying said corrective angular offset to said optical axis of said eye of said user.

8. The method of claim 1, wherein said estimating comprises:
calculating an approximation of said point-of-gaze using said coordinates in said image of said plurality of defined eye features;
calculating a corrective offset for said approximation to account for an angle between the optical axis and the line-of-sight of said eye of said user, using said at least one angle; and
estimating said intersection of the line-of-sight of said eye of said user with said plane of said display by applying said corrective offset to said approximation.

9. The method of claim 8, wherein said corrective offset is calculated using a predetermined offset calibrated for said user for a given orientation of said head of said user.

10. The method of claim 1, further comprising determining pixel coordinates in a current image coordinate system of said display, corresponding to said estimated intersection of the line-of-sight of said eye of said user with said plane of said display.

11. The method of claim 10, further comprising receiving an indicator indicative of a change in said current image coordinate system.

12. The method of claim 1, wherein said plurality of eye features comprises at least one of an iris-sclera boundary, an iris center, a pupil center, a pupil boundary, and a reflection of a light source.

13. A method of estimating point-of-gaze of a user looking at a display, said method comprising:
capturing an image of an eye of said user using a camera, said camera interconnected to at least one processor;
processing said image using said at least one processor to determine coordinates in said image of a plurality of defined eye features sufficient to determine the optical axis of said eye of said user;
determining at least one angle proportional to an angle between (i) a line coincident with an edge of said display and (ii) an intersection of the sagittal plane of the head of said user with a plane of said display; and
estimating an intersection of the line-of-sight of said eye of said user with said plane of said display, using said coordinates of said plurality of defined eye features sufficient to determine the optical axis of said eye, and using said at least one angle to account for rotation of said head of said user or said display.

14. A device for estimating point-of-gaze of a user looking at a display, said device comprising:
a camera;
at least one processor interconnected to said camera; and
memory interconnected to said at least one processor, said memory storing software code that, upon execution by said at least one processor, causes said device to:
receive an image of an eye of said user from said camera;
process said image to determine coordinates in said image of a plurality of defined eye features sufficient to determine the optical axis of said eye of said user;
determine at least one angle proportional to an angle between (i) a line coincident with an edge of said display and (ii) an intersection of the sagittal plane of the head of said user with a plane of said display; and
estimate an intersection of the line-of-sight of said eye of said user with said plane of said display, using the optical axis of said eye, and using said at least one angle to account for rotation of said head of said user or said display.

15. The device of claim 14, wherein said image received from said camera includes a plurality of defined head features, and said determining at least one angle further comprises processing said image to determine coordinates in said image of said plurality of defined head features and calculating said at least one angle using said coordinates in said image of said plurality of defined head features.

16. The device of claim 14, further comprising at least one light source adapted to generate a reflection in said eye of said user, and said plurality of defined eye features includes said reflection.

17. The device of claim 14, further comprising at least one sensor adapted to provide an indicator of said at least one angle.

18. The device of claim 17, wherein said at least one sensor comprises a gyroscope or an accelerometer.

19. The device of claim 14, wherein said display is integral to said device.

20. The device of claim 14, wherein said device is a mobile phone or a tablet computer.

21. The device of claim 14, wherein said camera is an infrared camera.

22. The device of claim 14, wherein said device further comprises a depth camera or a 3D camera.

* * * * *